(12) United States Patent
Tamura

(10) Patent No.: US 6,333,978 B1
(45) Date of Patent: Dec. 25, 2001

(54) TELEPHONE SYSTEM

(75) Inventor: Harumichi Tamura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/328,891

(22) Filed: Jun. 9, 1999

(30) Foreign Application Priority Data

Jun. 10, 1998 (JP) .................................... 10-161943

(51) Int. Cl.[7] .............................. H04M 1/56; H04M 1/24
(52) U.S. Cl. .................... 379/142; 379/93.23; 379/1.01; 379/142.05; 379/142.12; 379/142.17; 455/415
(58) Field of Search ................................ 379/142, 93.17, 379/93.23, 167, 168, 171, 172, 173, 177, 179, 182, 183, 184, 188, 189, 199, 200; 455/415, 462, 465

(56) References Cited

U.S. PATENT DOCUMENTS

| 5,396,548 | * | 3/1995 | Bayer et al. | 379/140 |
| 5,425,089 | * | 6/1995 | Chan et al. | 379/183 |
| 5,479,493 | * | 12/1995 | Baker et al. | 379/127 |
| 5,550,900 | * | 8/1996 | Ensor et al. | 379/67.1 |
| 5,920,615 | * | 7/1999 | Nolde | 379/142 |

FOREIGN PATENT DOCUMENTS 5-191497 A    7/1993  (JP) .............................. H04M/3/42

* cited by examiner

Primary Examiner—Binh Tieu
(74) Attorney, Agent, or Firm—Nixon & Vanderhye P.C.

(57) ABSTRACT

It is an object of the invention to provide a telephone system which is capable of protecting privacy of a manager of a slave unit on an incoming caller telephone number as well as protecting privacy of a manager of a master unit on an incoming caller telephone number. The telephone system of the invention comprises a master unit and at least one slave unit, wherein when incoming caller telephone number data is associated with the master unit, the caller telephone number data is displayed only at the master unit and held in a history storage buffer, and when incoming caller telephone number data is associated with the slave unit, the caller telephone number data is transmitted from the master unit to the associated slave unit to be displayed at the associated slave unit as well as held in a history storage buffer. By inputting a secret number at the master unit, incoming caller telephone number data which is associated with the master unit is displayed/printed, and by inputting a secret number at the slave unit, incoming caller telephone number data which is associated with the slave unit is displayed.

5 Claims, 17 Drawing Sheets

FIG. 5

9a TELEPHONE DIRECTORY TABLE

| CALLER TELEPHONE NUMBER | CALLED TERMINAL |
|---|---|
| 0 3 − 1 1 1 1 − 2 2 ○○ | MASTER UNIT |
| ............................... | MASTER UNIT |
| ⋮ | |
| 0 3 − 1 1 1 1 − 5 5 □□ | SLAVE UNIT 1 |
| ............................... | SLAVE UNIT 1 |
| ⋮ | |
| 0 3 − 1 1 1 1 − 9 9 △△ | SLAVE UNIT 2 |
| ............................... | SLAVE UNIT 2 |
| ⋮ | |
| 0 3 − 2 2 2 2 − ×××× | SLAVE UNIT 3 |
| ............................... | SLAVE UNIT 3 |
| ⋮ | |

FIG. 13

HISTORY STORAGE BUFFER OF MASTER UNIT 9c

LATEST DATA

| | | |
|---|---|---|
| 1 | 0 3 - 1 1 1 1 - 2 2 ○○ | MASTER UNIT |
| 2 | 0 3 - 1 2 3 4 - 5 6 ×× | MASTER UNIT |
| 3 | 0 3 - 1 1 1 1 - 5 5 □□ | SLAVE UNIT 1 |
| 4 | 0 6 - 1 2 3 - 4 5 ×× | SLAVE UNIT 1 |
| 5 | 0 3 - 1 1 1 1 - 9 9 △△ | SLAVE UNIT 2 |
| ⋮ | ⋮ | |
| m | 0 3 - 2 2 2 2 - ×××× | SLAVE UNIT 3 |

DELETE

FIG. 14

9d SECRET NUMBER TABLE

| TERMINAL CODE | SECRET NUMBER |
|---|---|
| CODE OF MASTER UNIT #0 | ○○○○ |
| CODE OF SLAVE UNIT 1 #1 | □□□□ |
| CODE OF SLAVE UNIT 2 #2 | ×××× |
| CODE OF SLAVE UNIT 3 #3 | △△△△ |

TELEPHONE SYSTEM

BACKGROUND OF THE INVENTION

1. Field of the Invention

The present invention relates to a telephone system which is composed of a set of a master unit and a slave unit and provided with a function of recognizing a caller telephone number, and more particularly relates to a technology for protecting privacy from being infringed. Although the telephone system of the invention is mainly a cordless telephone, a master unit may be provided with a facsimile apparatus, as a master unit.

2. Description of the Related Art

As a telephone system which is ready for a number display service (a caller telephone number display service) and a modem dial-in service, there is provided a telephone system whose master unit and slave unit are both provided with a function of storing a caller telephone number. Further, there is also provided a telephone system which is provided with a function of setting a called terminal between a master unit and a slave unit for each caller telephone number.

These telephone systems are disclosed in Japanese Unexamined Patent Publication JP-A 5-191497 (1993). The telephone systems disclosed in this publication that utilize a selective calling system are equipped with a management table where identification numbers which are respectively associated with a master unit and a slave unit are registered. When a call comes in, the master unit compares the telephone number of the incoming call with the identification numbers stored in the management table. In the case where the telephone number matches one of the identification numbers, only the master unit or slave unit that is associated with the identification number is called, and in the case where the telephone number does not match any of the identification numbers, both the master unit and the slave unit are called.

In the conventional telephone systems which are ready for the number display service, the master unit is absolutely capable of storing a history of incoming caller telephone numbers and displaying it, with the result that a caller telephone number which comes in for the slave unit can be known at the master unit and privacy is sometimes invaded.

SUMMARY OF THE INVENTION

The present invention was made for the purpose of solving the aforementioned problem, and it is an object of the invention to protect privacy of a manager of a slave unit with respect to incoming caller telephone numbers as well as to protect privacy of a manager of a master unit with respect to incoming caller telephone numbers.

It is assumed that a telephone system relating to the invention comprises a master unit and at least one slave unit and the master unit has a function of recognizing caller telephone number data which comes in from a line. Then, in order to make caller telephone numbers of calls for the master unit perceived only by the manager of the master unit and to protect the privacy of the manager of the master unit with respect to incoming caller telephone numbers from a person other than the manager, the telephone system is configured in a manner that when caller telephone number data which comes in the master unit is associated with the master unit, the caller telephone number data is displayed/held only at the master unit. Further, in order to make caller telephone numbers of calls for the slave unit perceived only by the manager of the slave unit and protect the privacy of the manager of the slave unit from a person other than the manager of the slave unit, the telephone system is configured in a manner that when caller telephone number data which comes in the master unit is associated with the slave unit, the caller telephone number data is held in the master unit for each slave unit or transmitted from the master unit to the associated slave unit, and in the case where it is held in the master unit, only the manager of the slave unit can perceive it by inputting a secret number while the caller telephone number data is displayed/held only at the associated slave unit which receives the caller telephone number data. Herein, "display/hold" means either displaying or holding, and both of displaying and holding. This applies to the description of accompanying claims.

The present invention provides a telephone system comprising a master unit and at least one slave unit, wherein when incoming caller telephone number data is associated with the master unit, the incoming caller telephone number data is displayed/held only at the master unit, and when incoming caller telephone number data is associated with the slave unit, the incoming caller telephone number data is transmitted from the master unit to the associated slave unit and displayed/held only at the associated slave unit.

According to the invention concerning a telephone system whose master unit is provided with a function of recognizing caller telephone number data and transmitting caller telephone number data to a slave unit, caller telephone number data which is associated with the master unit is displayed/held only at the master unit, whereby privacy on the data is protected from the manager of the slave unit and so on, and caller telephone number data which is associated with the slave unit is displayed/held only at the slave unit, whereby privacy on the data is protected from the manager of the master unit, the manager of the other slave unit and so on.

In the invention it is preferable that when the transmission of the incoming caller telephone number data from the master unit to the associated slave unit ends in failure, the incoming caller telephone number data is merely held at the master unit in association with the associated slave unit.

According to the invention, in the case where the transmission to the associated slave unit ends in failure, the incoming caller telephone number data which is associated with the slave unit is merely held at the master unit in association with the associated slave unit, with the result that the incoming caller telephone number data which is associated with the slave unit can be preserved as a history, and since the data is not displayed at the master unit, privacy on it can be a protected.

In the invention it is preferable that a transmission of the incoming caller telephone number data from the master unit to the associated slave unit is attempted again after the failure of transmission and when said transmission is successfully conducted, the incoming caller telephone number data which is held at the master unit in association with the associated slave unit is deleted.

According to the invention, in the case where the transmission of the incoming caller telephone number data to the associated slave unit ends in failure, when a transmission of the incoming caller telephone number data to the associated slave unit is attempted again and the master unit and the slave unit are connected to each other, the incoming caller telephone number data which is held at the master unit is deleted upon the transmission of the incoming caller telephone number data to the associated slave unit, with the result that protection of privacy of the manager of the slave unit is ensured.

In the invention it is preferable that incoming caller telephone number data which is associated with the master unit is displayed/printed by inputting a secret number at the master unit, while incoming caller telephone number data which is associated with the slave unit is displayed by inputting a secret number at the slave unit.

According to the invention, both at the master unit and at the slave unit, incoming caller telephone number data which comes in for the respective units is displayed/printed only when a respectively required secret number is inputted, with the result that it is possible to confirm incoming history data by one operation, and since only the associated person is capable of confirming it, it is possible to protect privacy.

The present invention provides a telephone system comprising a master unit and at least one slave unit, wherein when incoming caller telephone number data is associated with the master unit, the incoming caller telephone number data is displayed/held only at the master unit in association with the master unit, and when incoming caller telephone number data is associated with the slave unit, the incoming caller telephone number data is transmitted from the master unit to the associated slave unit to display only at the associated slave unit, and is merely held in the master unit in association with the associated slave unit.

According to the invention, the incoming caller telephone number data for the master unit is held in the master unit in association with the master unit, and the incoming caller telephone number data for the slave unit is also held in the master unit in association with the slave unit, with the result that even when the slave unit does not have means for holding a history of caller telephone number data, it is possible to protect privacy as well as store a history of caller telephone number data for the slave unit.

The invention provides a telephone system comprising a master unit and at least one slave unit, wherein when incoming caller telephone number data is associated with the master unit, the incoming caller telephone number data is displayed/held only at the master unit in association with the master unit, and when incoming caller telephone number data is associated with the slave unit, the incoming caller telephone number data is merely held in the master unit in association with the associated slave unit.

According to the invention, when incoming caller telephone number data is associated with the slave unit, the incoming caller telephone number data is not transmitted from the master unit to the slave unit and the data is merely held in the master unit in association with the associated slave unit, with the result that even in the case where the slave unit is not provided with means for storing a history or a function of displaying a telephone number, it is possible to preserve caller telephone number data which is associated with the slave unit as a history, and since the data is not displayed at the master unit, it is possible to protect privacy of the manager of the slave unit.

In the invention it is preferable that incoming caller telephone number data which is associated with the master unit is displayed/printed by inputting a secret number which is associated with the slave unit, at the master unit, incoming caller telephone number data which is associated with the slave unit is displayed/printed by inputting a secret number which is associated with the slave unit, at the master unit, and incoming caller telephone number data which is associated with the slave unit is displayed/printed at the master unit via a radio communication by inputting a secret number which is associated with the slave unit, at the slave unit.

According to the invention, only incoming caller telephone number data for the slave unit which is held in the master unit is displayed/printed at the master unit by inputting a secret number which is associated with the slave unit, at the master unit, or inputting a secret number which is associated with the slave unit, at the slave unit, with the result that privacy of the slave unit is protected and only the manager of the associated slave unit is capable of confirming incoming history data for the slave unit by one operation.

BRIEF DESCRIPTION OF THE DRAWINGS

Other and further objects, features, and advantages of the invention will be more explicit from the following detailed description taken with reference to the drawings wherein:

FIG. 5 is a view illustrating a telephone directory table in the case of the embodiment 1;

FIG. 13 is a view illustrating a history storage buffer of the master unit in the case of the embodiment 2;

FIG. 14 is a view illustrating a secret number table in the case of the embodiment 2;

DETAILED DESCRIPTION OF THE PREFERRED EMBODIMENTS

Figure 1:
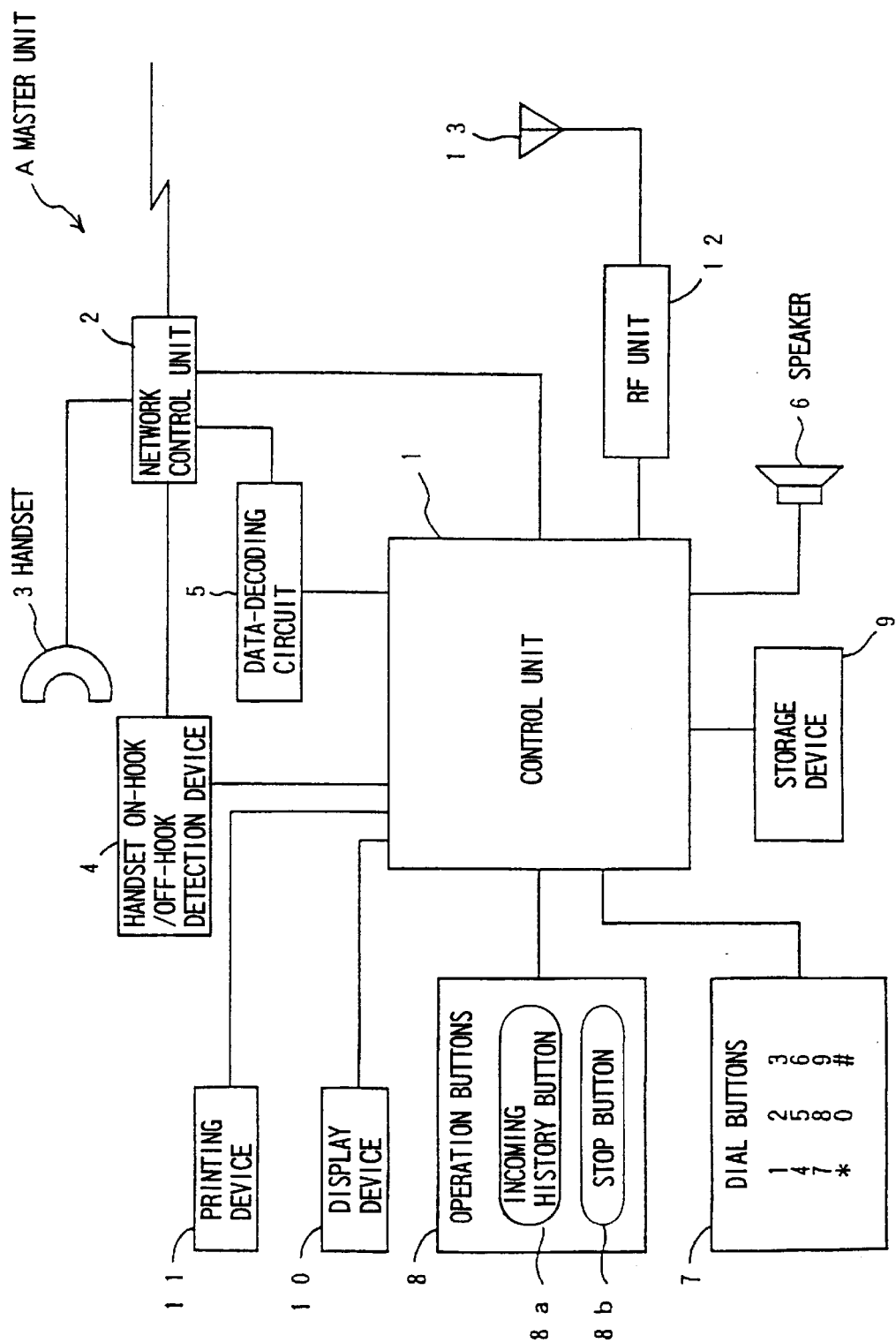
FIG. 1 is a block diagram showing an electrical configuration of a master unit in a telephone system which is ready for a number display service relating to an embodiment 1 of the present invention.

Now referring to the drawings, preferred embodiments of the invention are described below.

In the following, an embodiment of a telephone system relating to the present invention which is ready for a number display service/a modem dial-in service (in the following, "the number display service" will represent them) will be illustrated with reference to the drawings.

Figure 2:
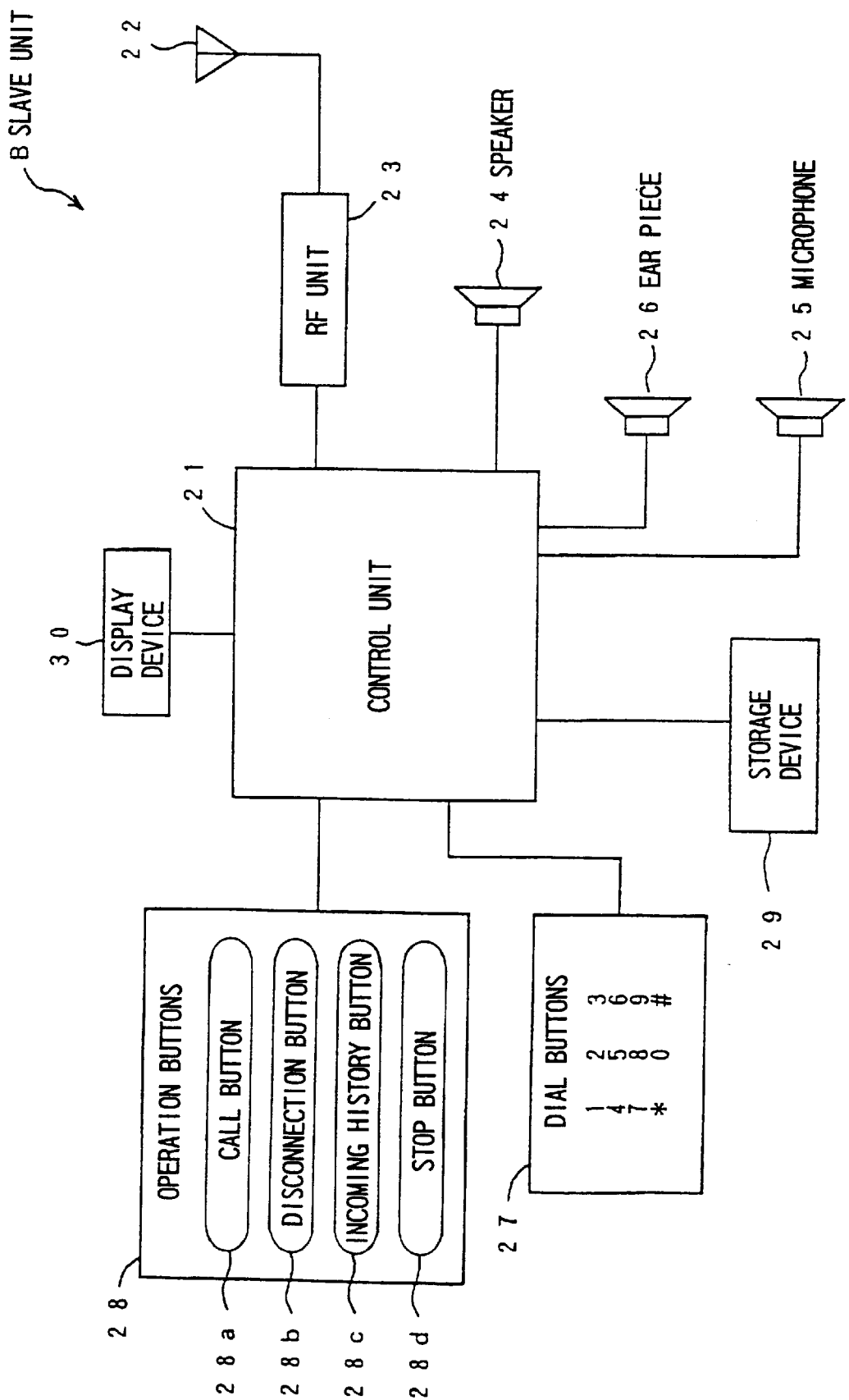
FIG. 2 is a block diagram showing an electrical configuration of a slave unit in the telephone system of the embodiment 1.

A telephone system relating to an embodiment 1 of the invention which is ready for the number display service comprises a master unit A as shown in FIG. 1 and at least one slave unit B as shown in FIG. 2. FIG. 1 and FIG. 2 are block diagrams showing electrical configurations of the master unit A and the slave unit B in the telephone system relating to the embodiment 1 which is ready for the number display service. The master unit A includes a control unit 1, a network control unit (NCU) 2, a handset 3, a handset lift/putdown detection device 4, a data decode circuit 5, a speaker 6, a group of dial buttons 7, a group of operation buttons 8, a storage device 9, a display device 10, a printing device 11, an RF unit 12, and an antenna 13. The slave unit B includes a control unit 21, an antenna 22, an RF unit 23, a speaker 24, a microphone 25, an earpiece 26, a group of dial buttons 27, a group of operation buttons 28, a storage device 29, and a display device 30.

In FIG. 1, the control unit 1 controls an operation of the overall master unit A. The handset 3 is connected to the network control unit 2, thereby transmitting and receiving a call. The handset lift/putdown detection device 4 detects whether the handset 3 is lifted or put down. The data decode circuit 5 decodes data of an incoming caller telephone number and so on. The speaker 6 outputs a call tone or the like. The group of operation buttons 8 consists of an incoming history button 8a which provides an instruction to display a caller telephone number, a stop button 8b which directs to clear the display, and another operation button. The storage device 9 stores caller telephone number data and another setting data. The display device 10 displays a caller telephone number and so on. The RF unit 12 includes a tuner circuit and a detector circuit. The antenna 13 receives and gives radio waves from and to the slave unit B. The respective components 1 to 13 within the master unit A are connected as shown in the figure.

In FIG. 2, the control unit 21 controls an operation of the overall slave unit B. The antenna 22 receives and gives radio waves from and to the master unit A. The RF unit 23 includes a tuner circuit and a detector circuit. The speaker 24 outputs a call tone or the like. The group of operation buttons 28 consists of a call button 28a, a disconnection button 28B, an incoming history button 28c, a stop button 28d, and another operation button. The storage device 29 stores caller telephone number data and another setting data. The display device 30 displays a caller telephone number and so on. The respective components 21 to 30 within the slave unit B are connected as shown in the figure.

Figure 3:
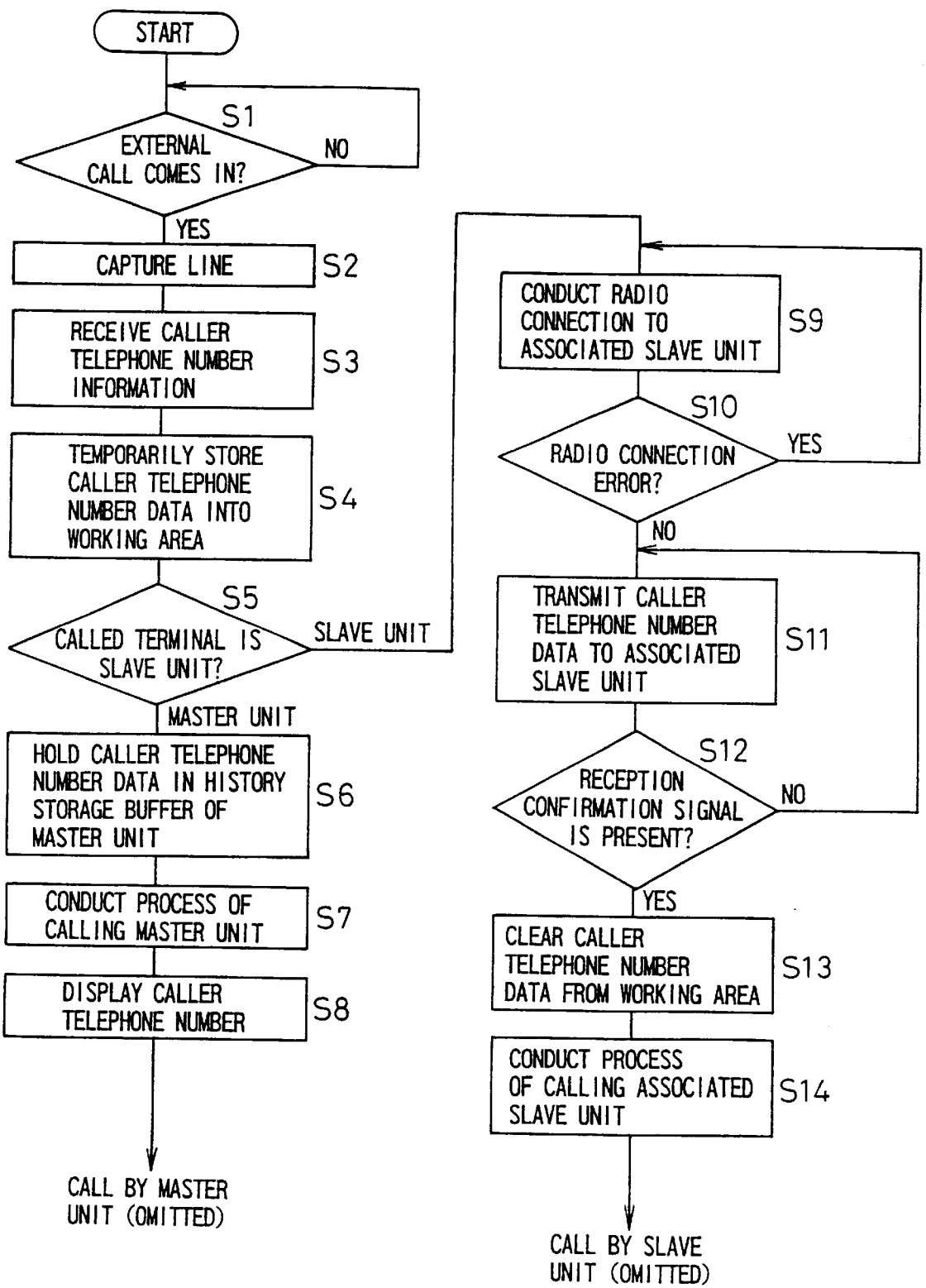
FIG. 3 is a flow chart showing an early operation of the master unit when an outside call comes in, in the case of the embodiment 1.

Next, with regard to the telephone system relating to the embodiment 1 which is configured as described above, an early operation of the master unit A when an outside call comes in will be illustrated with reference to a flow chart of FIG. 3. As shown in FIG. 5, in advance, telephone directory information in which a telephone number (a counterpart telephone number, i.e., a caller telephone number) is associated with a terminal is registered into a telephone directory table 9a of the storage device 9 of the master unit A as a terminal to be called (the master unit or the slave unit) when an outside call comes in. For instance, a caller telephone number 03-1111-22○○ is associated with the master unit, 03-1111-55□□ is associated with a slave unit 1, 03-1111-99∆∆ is associated with a slave unit 2, 03-2222-X X X X is associated with a slave unit 3, and the respective association relations are registered in the telephone directory table 9a of the storage device 9 of the master unit A.

At step S1, the control unit 1 of the master unit A determines whether an outside call comes in or not via the network control unit 2, and in the case where an outside call comes in, the operation goes to step S2 where the control unit 1 directs the network control unit 2 to trap a line. At step S3, the control unit 1 directs the data decode circuit 5 to capture caller telephone number information. The data decode circuit 5 decodes caller telephone number information which is sent from the line, thereby obtaining caller telephone number data. At step S4, the control unit 1 temporarily stores the obtained caller telephone number data into a working area of the storage device 9.

Figure 6A:
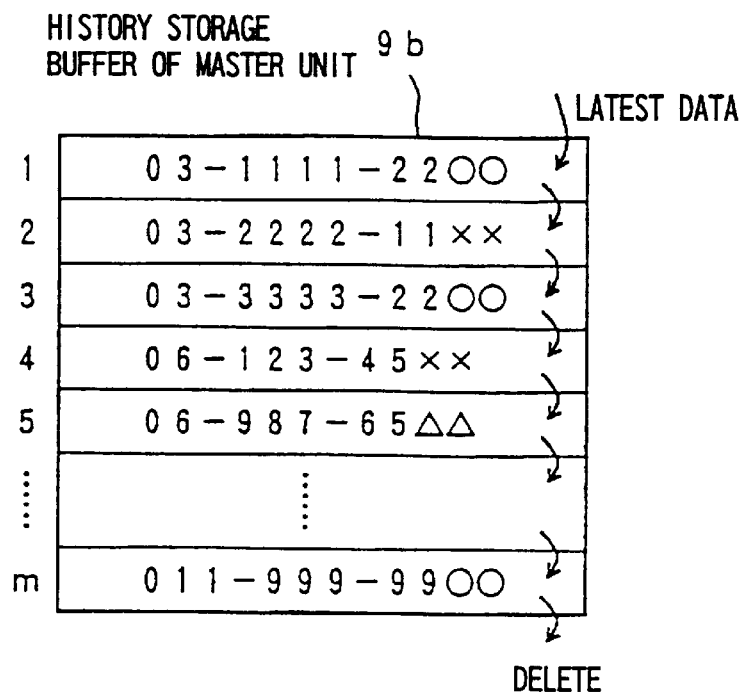
FIGS. 6A and 6B are views illustrating history storage buffers of the master unit and the slave unit in the case of the embodiment 1.

At step S5, the control unit 1 searches the telephone directory table 9a of the storage device 9 on the basis of the obtained caller telephone number data and determines whether a terminal to be called (a called terminal) is the slave unit or not. In the case where the called terminal is judged as being the master unit, the operation goes to step S6 where the caller telephone number data which is temporarily stored in the working area of the storage device 9 is held in a history storage buffer 9b of the storage device 9 as shown in FIG. 6A, and the control unit 1 directs the speaker 6 of the master unit A to output a call tone in synchronization with an outside call incoming signal which is received via the network control unit 2 at step S7 and reads the caller telephone number data out of the working area of the storage device 9 to output it to the display device 10 and display a caller telephone number at the display device 10 at step 8.

After these operations, when the handset 3 is lifted at the master unit A, the handset lift/putdown detection device 4 detects it and the operation goes to a process of a call. However, since it deviates from the object of the invention and it is a general operation, an illustration thereof will be omitted. When the call is finished and the handset 3 is put down to be on-hook, the caller telephone number data is cleared from the working area of the storage device 9.

In the case where the called terminal is the slave unit as a result of a judgement at step S5, the operation goes to step S9 where the control unit 1 provides an instruction to conduct a radio connection from the RF unit 12 to the associated slave unit B via the antenna 13. Then, the control unit 1 determines whether a radio connection error occurs or not on the basis of radio connection information from the slave unit B at step S10, and when there is an error, the operation goes back to step S9 where a process of a radio connection is repeated. In the case where the radio connection is normally conducted, the operation goes to step S11 where the control unit 1 reads the caller telephone number data out of the working area of the storage device 9 and transmits the caller telephone number data from the RF unit 12 to the associated slave unit B via the antenna 13, and at step S12, the control unit 1 determines whether or not it receives from the slave unit B a reception confirmation signal for confirming that the slave unit B receives the caller telephone number data, and when the reception confirmation signal is not present, the operation goes back to step S11 where transmission of the caller telephone number data to the slave unit B is repeated. In the case where the reception confirmation signal is present, the operation goes to step S13 where the caller telephone number data is cleared from the working area of the storage device 9. Therefore, the master unit A substitutingly records the caller telephone number data while reception confirmation is conducted. Next, at step S14, a calling process to the associated slave unit B is conducted.

Then, after these operations, when the call button 28a of the group of operation buttons 28 is pushed at the slave unit B, the operation goes to a call between the slave unit B and the counterpart telephone terminal, and until the call at the slave unit B is finished, the RF unit 12 of the master unit A and the RF unit 23 of the slave unit B keep a radio connection status. However, since it deviates from the object of the invention and it is a general operation, an illustration thereof will be omitted.

Figure 4:
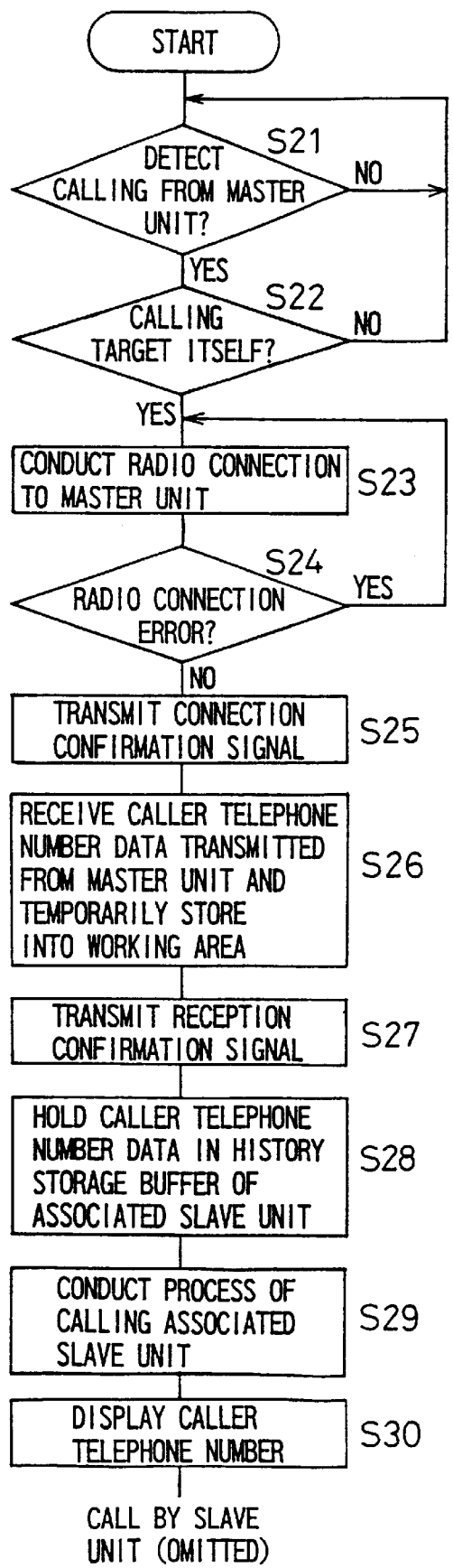
FIG. 4 is a flow chart showing an early operation of the slave unit when an outside call comes in, in the case of the embodiment 1.

Next, an early operation of the slave unit B when an outside call comes in will be illustrated with reference to a flow chart of FIG. 4. After the RF unit 23 detects a calling by radio waves from the master unit A via the antenna 22 at step S21, the operation goes to step S22 where the control unit 21 of the slave unit B determines whether or not the slave unit B itself is included in a called target sent by the radio waves. While it ignores when it is not included, when it is included, the operation goes to step S23 where the control unit 21 directs the RF unit 23 to conduct a radio connection to the master unit A. At step S24, the control unit 21 determines whether a radio connection error occurs or not on the basis of radio connection information from the master unit A, and in the case where an error occurs, the operation goes back to step S23 where a process of a radio connection is repeated.

In the case where a radio connection is normally conducted, the operation goes to step S25 where a connection confirmation signal is transmitted from the RF unit 23 to the master unit A via the antenna 22. Then, the control unit 21 receives caller telephone number data which is transmitted from the master unit A to temporarily store it into a working area of the storage device 29 at step S26, and transmits a reception confirmation signal from the RF unit 23 to the master unit A via the antenna 22 at step 27. The control unit 21 holds the received caller telephone number data in a history storage buffer 29a in the storage device 29 as shown in FIG. 6B at step S28, directs the speaker 24 of the slave unit B to output a call tone at step 29, reads the caller telephone number data out of the working area of the storage device 29 to output it to the display device 30 and display a caller telephone number at the display device 30 at step S30.

Then, after these operations, when the call button 28a of the group of operation buttons 28 is pushed at the slave unit B, the operation goes to a call between the slave unit B and the counterpart telephone terminal, and until the call at the slave unit B is finished, the control unit 1 of the master unit A keeps a status of a radio connection between the RF unit 12 of the master unit A and the RF unit 23 of the slave unit B. However, since it deviates from the object of the invention and it is a general operation, an illustration thereof will be omitted.

Figure 6B:
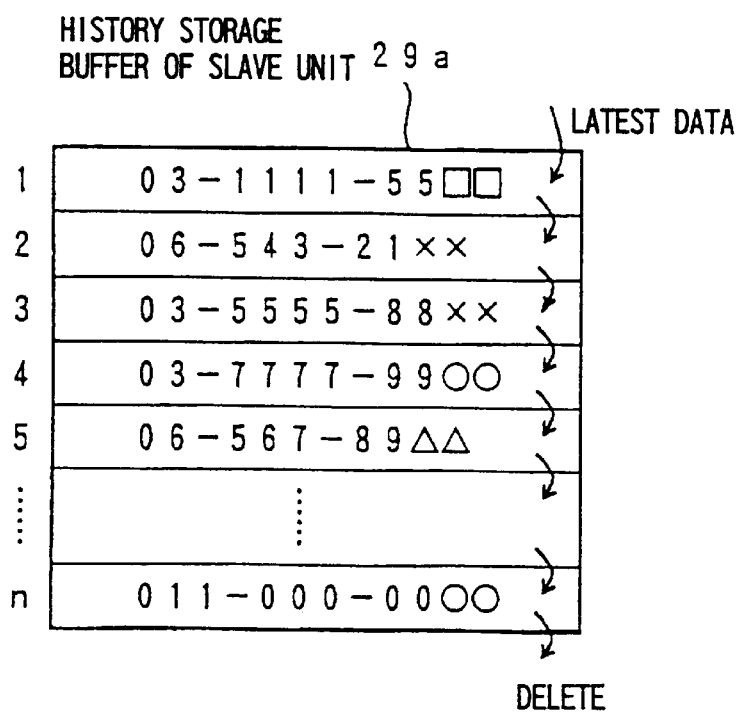

In the history storage buffer 9b of the master unit A as shown in FIG. 6A and the history storage buffer 29a of the slave unit B as shown in FIG. 6B, the latest caller telephone number data is always held in the first storage area. Therefore, caller telephone number data which is now coming in is always stored in the first storage area. When new caller telephone number data is obtained, caller telephone number data previously obtained and stored is transferred to a storage area to which the next larger number is assigned. For instance, as new caller telephone number data is obtained, caller telephone number data held in the first storage area is transferred and held in the second storage area, the latest caller telephone number data is held in the first storage area, caller telephone number data held in the second storage area is transferred and held in the third storage area, and caller telephone number data held in the last storage area ($m^{th}$ and $n^{th}$) is deleted.

As described above, in the telephone system relating to the embodiment 1, when incoming caller telephone number data is associated with the master unit, the incoming caller telephone number data is displayed/held only at the master unit. On the other hand, when incoming caller telephone number data is associated with the slave unit, the incoming caller telephone number data is transmitted from the master unit to the associated slave unit and the caller telephone number data is displayed/held only at the associated slave unit.

Accordingly, there is an advantage as described below when a call comes in. Since caller telephone number data of a call for the master unit A is not transmitted to any slave unit B, the caller telephone number data for the master unit is not perceived on the side of the slave unit B and privacy of the manager of the master unit is protected. On the other hand, since caller telephone number data of a call for the slave unit B is not transmitted to either the master unit A or any other slave unit B, the caller telephone number data for the slave unit is not perceived by anyone other than the manager of that slave unit and privacy of the manager of that slave unit is protected.

Figure 7:
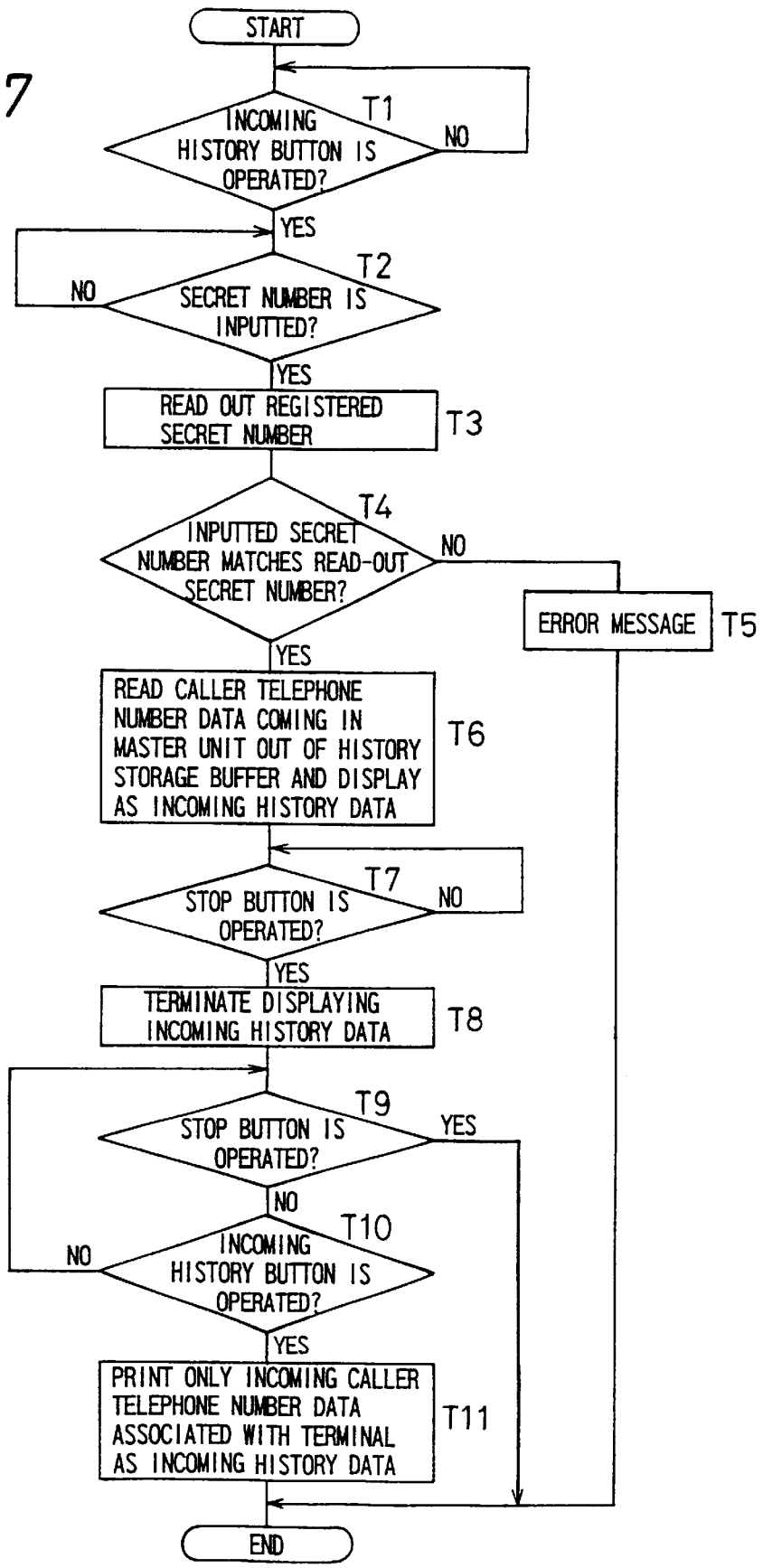
FIG. 7 is a flow chart showing an operation in a mode to display/print incoming history data at the master unit in the case of the embodiment 1.

Next, an operation in a mode to display/print incoming history data at the master unit A will be illustrated with reference to a flow chart of FIG. 7. In advance, a person who manages the master unit A operates the group of operation buttons 8 and the group of dial buttons 7, thereby registering a secret number into the storage device 9 of the master unit A. The operation in this mode is started by an operation of the incoming history button 8a of the group of operation buttons 8.

After the incoming history button 8a is operated at step T1, the operation goes to step T2, and after a secret number is inputted through the group of dial buttons 7, the operation goes to step T3 where the control unit 1 of the master unit A reads out the secret number registered in the storage device 9, and then the control unit 1 determines whether or not the inputted secret number matches the registered secret number at step T4. In the case where the secret numbers do not match each other, the operation goes to step T5 where the control unit 1 displays an error message at the display device 10 and then the operation is terminated. In the case where the secret numbers match each other, the operation goes to step T6 where the control unit 1 sequentially reads caller telephone number data which comes in the master unit A out of the history storage buffer 9b to display as incoming history data at the display device 10.

After the stop button 8b of the group of operation buttons 8 is operated at step T7, the operation goes to step T8 where the control unit 1 terminates display of incoming history data. Then, at step T9, the control unit determines again whether the stop button 8b is operated or not, and in the case where it is judged as being operated, the control unit 1 terminates the process. In the case where the stop button 8b is not operated, the operation goes to step T10 where the control unit 1 determines again whether the incoming history button 8a is operated or not. While the operation goes back to step T9 when it is not operated, when it is operated, the operation goes to step T11 where the control unit 1 controls the printing device 11 to read the incoming caller telephone number data which comes in the master unit A out of the history storage buffer 9b and print it as incoming history data.

Figure 8:
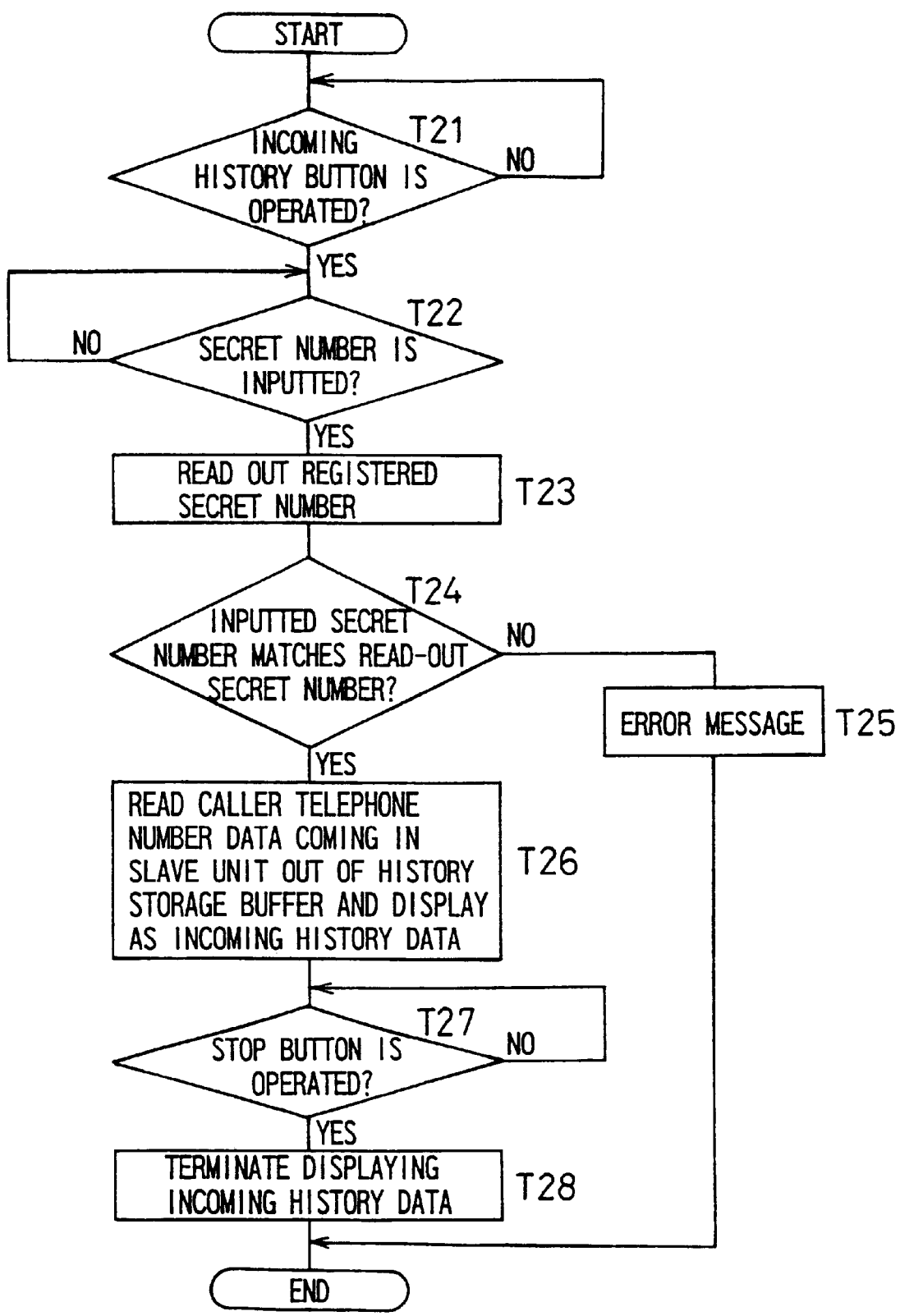
FIG. 8 is a flow chart showing an operation in a mode to display incoming history data at the slave unit in the case of the embodiment 1.

Next, an operation in a mode to display incoming history data at the slave unit B will be illustrated with reference to a flow chart of FIG. 8. In advance, a person who manages the slave unit B operates the group of operation buttons 28 and the group of dial buttons 27, thereby registering a secret number into the storage device 29 of the slave unit B. The operation in this mode is started by an operation of the incoming history button 28c of the group of operation buttons 28.

After the incoming history button 28c is operated at step T21, the operation goes to step T22, and after a secret number is inputted through the group of dial buttons 27, the operation goes to step T23 where the control unit 21 of the slave unit B reads out the secret number registered in the storage device 29, and then the control unit 1 determines whether or not the inputted secret number matches the registered secret number at step T24. In the case where the secret numbers do not match each other, the operation goes to step T25 where the control unit 1 displays an error message at the display device 30 and terminates the process.

In the case where the secret numbers matches each other, the operation goes to step T26 where the control unit 1 sequentially reads caller telephone number data which comes in the slave unit B out of the history storage buffer 29a to display it as incoming history data at the display device 30. Then, after the stop button 28d of the group of operation buttons 28 is operated at step T27, the operation goes to step T28 where the control unit terminates the process of displaying incoming history data.

As described above, in the telephone system relating to the embodiment 1, incoming caller telephone number data which is associated with the master unit is displayed/printed by inputting a secret number at the master unit A. Then, incoming caller telephone number data which is associated with the slave unit is displayed by inputting a secret number at the slave unit B.

Accordingly, there is an advantage as described below after a plurality of calls come in. Since incoming history data of a call for the master unit A is displayed and printed when the manager of the master unit inputs a secret number which only the manager of the master unit knows at the master unit A, only the manager of the master unit is capable of perceiving incoming history data for the master unit by one operation, and hence privacy of the manager of the master unit is protected. Further, since incoming history data of a call for the slave unit B is displayed and printed when the manager of the slave unit inputs a secret number which only the manager of the slave unit knows at the master unit A, only the manager of the slave unit is capable of perceiving incoming history data for the slave unit, and hence privacy of the manager of that slave unit is protected.

Next, a telephone system relating to an embodiment 2 will be illustrated. This telephone system comprises a master unit A and at least one slave unit B, wherein the slave unit B is not equipped with means for storing incoming history data of a caller telephone number. The configuration of the master unit A and the configuration of the slave unit B in the case of the embodiment 2 are identical to those in the case of the embodiment 1, respectively.

Figure 9:
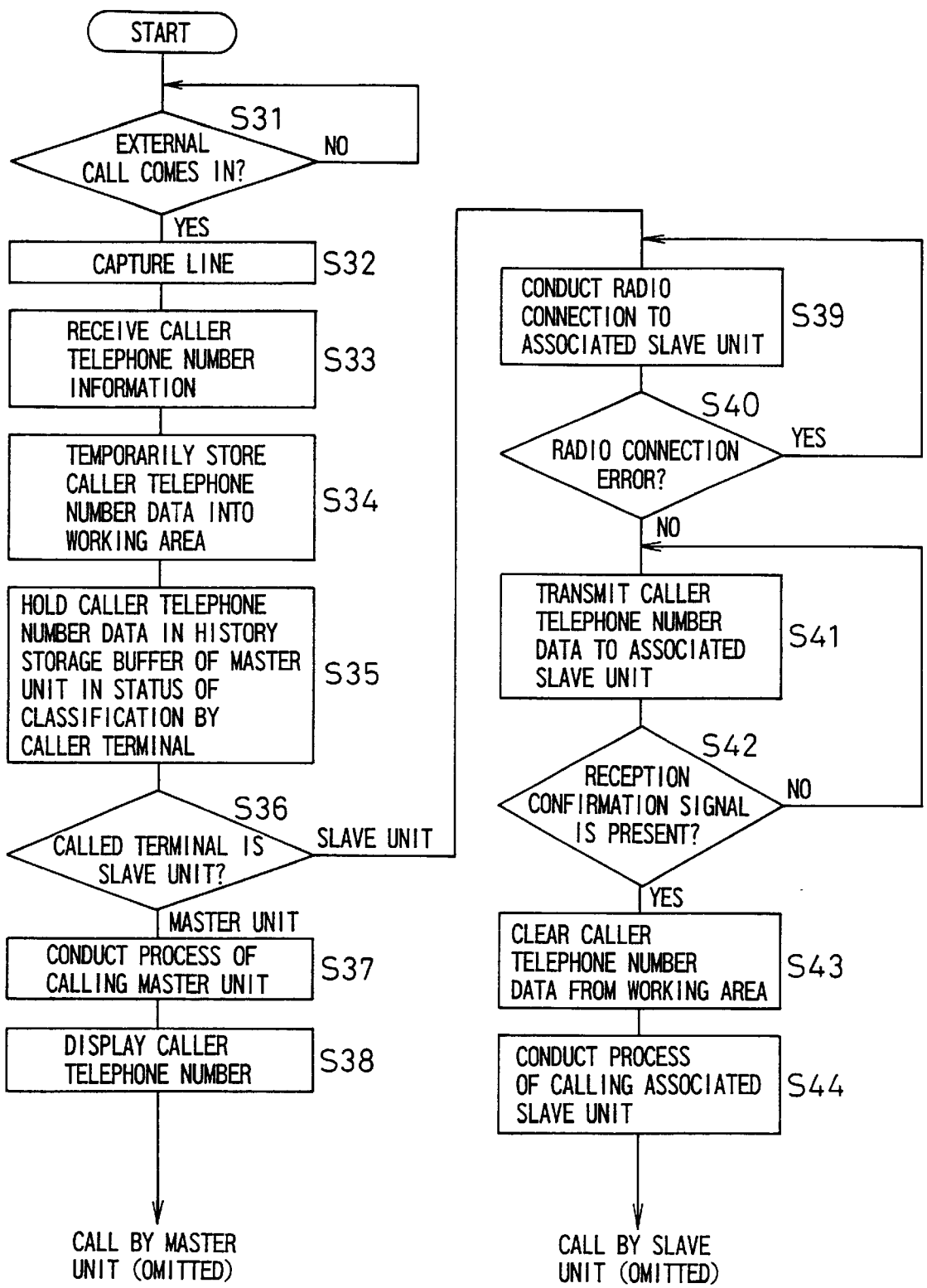
FIG. 9 is a flow chart showing an early operation of the master unit when an outside call comes in, in the case of an embodiment 2.

An early operation of the master unit A of the telephone system configured as described above when an outside call comes in will be illustrated with reference to a flow chart of FIG. 9. In the same manner as in the embodiment 1, as shown in FIG. 5, in advance, telephone directory information in which a telephone number (a counterpart telephone number, i.e., a caller telephone number) is associated with a terminal is registered into a telephone directory table 9a of the storage device 9 of the master unit A as a terminal to be called (the master unit or the slave unit) when an outside call comes in.

At step 31, the control unit 1 of the master unit A determines whether an outside call comes in or not via the network control unit 2, and in the case where an outside call comes in, the operation goes to step S32 where the control unit 1 directs the network control unit 2 to trap a line. At step S33, the control unit 1 directs the data decode circuit 5 to capture caller telephone number information. The data decode circuit 5 decodes caller telephone number information which is sent from the line and obtains caller telephone number data. At step S34, the control unit 1 temporarily stores the obtained caller telephone number data into a working area of the storage device 9.

Furthermore, at step S35, the caller telephone number data which is temporarily stored in the working area of the storage device 9 is held in a history storage buffer 9c in the storage device 9 as shown in FIG. 13 in the status of being classified for each called terminal which is associated in the telephone directory table 9a. For instance, when the telephone directory table 9a is searched on the basis of the obtained caller telephone number "03-1111-55□□," it is found that a called terminal is a slave unit 1, with the result that the caller telephone number "03-1111-55□□" is associated with "the slave unit 1" and the data is held in the history storage buffer 9c. Further, for example, when the telephone directory table 9a is searched on the basis of the obtained caller telephone number "03-1111-22○○," it is found that a called terminal is the master unit, with the result that the caller telephone number "03-1111-22○○" is associated with "the master unit" and the data is held in the history storage buffer 9c.

At step S36, the control unit 1 searches the telephone directory table 9a of the storage device 9 on the basis of the obtained caller telephone number data and determines whether a terminal to be called (a called terminal) is the slave unit or not. In the case where the called terminal is the master unit, the operation goes to step S37 where the control unit 1 directs the speaker 6 of the master unit A to output a call tone in synchronization with an outside call incoming signal which is received via the network control unit 2, and the control unit 1 reads the caller telephone number data out of the working area of the storage device 9 to output it to the display device 10 and display a caller telephone number at the display device 10 at step S38. After these operations, in the same manner as in the embodiment 1, when the call is finished and the handset 3 is put down to be on-hook, the caller telephone number data is cleared from the working area of the storage device 9.

In the case where the called terminal is the slave unit as a result of the judgement at step S36, the operation goes to step S39 where the control unit 1 directs to conduct a radio connection to the associated slave unit B from the RF unit 12 via the antenna 13. Then, at step S40, the control unit 1 determines whether a radio connection error occurs or not on the basis of radio connection information from the slave unit B, and in the case where an error occurs, the operation goes back to step S39 where a process of a radio connection is repeated.

In the case where the radio connection is normally conducted, the operation goes to step S41 where the control unit 1 reads the caller telephone number data out of the working area of the storage device 9 and transmits the caller telephone number data from the RF unit 12 to the associated slave unit B via the antenna 13, and at step S42, the control unit 1 determines whether or not it receives from the slave unit B a reception confirmation signal for confirming that the slave unit B receives the caller telephone number data. In the case where there is no reception confirmation signal, the operation goes back to step S41 where transmission of the caller telephone number data to the slave unit B is repeated.

In the case where there is a reception confirmation signal, the operation goes to step S43 where the caller telephone number data is cleared from the working area of the storage device 9. Subsequently, at step 44, a calling process to the associated slave unit B is conducted. Then, after these operations, when the call button 28a of the group of operation buttons 28 is pushed at the slave unit B, the operation goes to a call between the slave unit B and the counterpart telephone terminal, and until the call at the slave unit B is finished, the RF unit 12 of the master unit A and the RF unit 23 of the slave unit B keep a status of a radio connection. However, since it deviates from the object of the invention and it is a general operation, an illustration thereof will be omitted.

Figure 10:
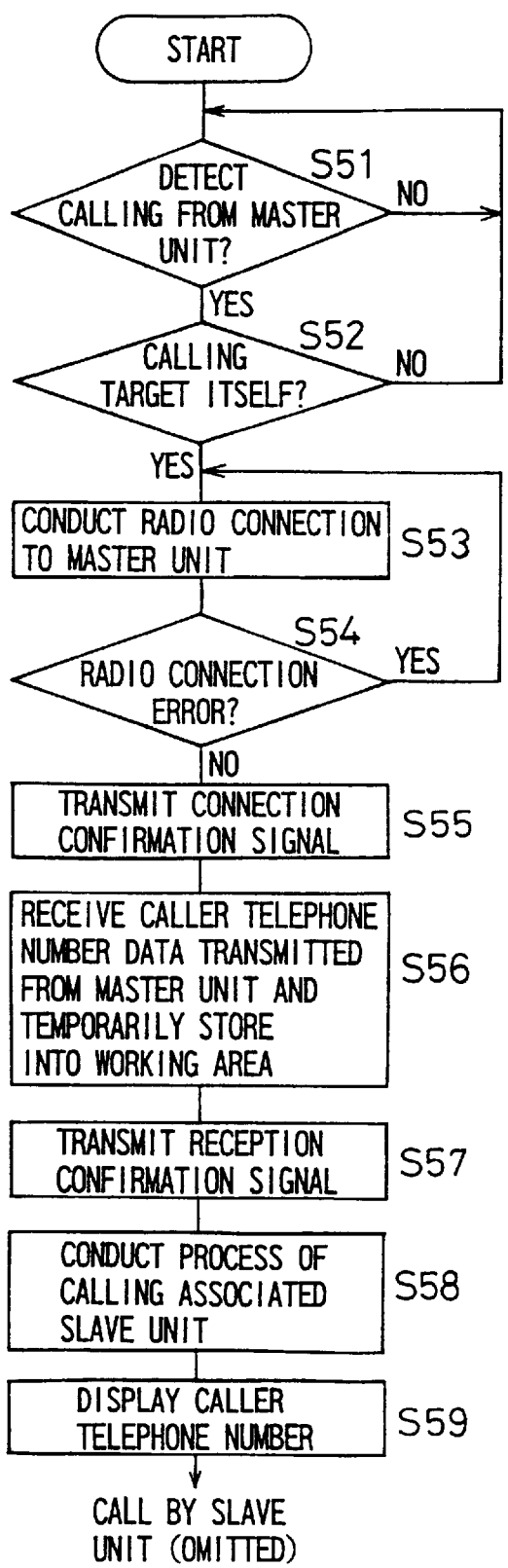
FIG. 10 is a flow chart showing an early operation of the slave unit when an outside call comes in, in the case of the embodiment 2.

Next, an early operation of the slave unit B when an outside call comes in will be illustrated with reference to a flow chart of FIG. 10. After the RF unit 23 detects a call by radio waves coming from the master unit A via the antenna 22 at step S51, the operation goes to step S52 where the control unit 21 of the slave unit B determines whether or not the slave unit B itself is included in a called target which is sent by the radio waves. Although it ignores when it is not included, when it is included, the operation goes to step S53 where it directs the RF unit 23 to conduct a radio connection to the master unit A. At step S54, the control unit 21 determines whether or not a radio connection error occurs on the basis of radio connection information from the master unit A, and in the case where an error occurs, the operation goes back to step S53 where a process of a radio connection is repeated.

In the case where a radio connection is normally conducted, the operation goes to step S55 where a connection confirmation signal is transmitted from the RF unit 23 to the master unit A via the antenna 22. Then, the control unit 21 receives caller telephone number data which is transmitted-from the master unit A to temporarily store it into a working area of the storage device 29 at step S56, and transmits a reception confirmation signal from the RF unit 23 to the master unit A via the antenna 22 at step 57. The control unit 21 directs the speaker 24 of the slave unit B to output a call tone at step S58, reads the caller telephone number data out of the working area of the storage device 29 to output it to the display device 30 and display a caller telephone number at the display device 30 at step S59.

According to the embodiment 2, at the slave unit B, a caller telephone number is displayed while caller telephone number data is not held as incoming history data. After these operations, when the call button 28a of the group of operation buttons 28 is pushed at the slave unit B, the operation goes to a call between the slave unit B and the counterpart telephone terminal, and until the call at the slave unit B is finished and the disconnecting button 28b is operated, the control unit 1 of the master unit A keeps a status of a radio connection between the RF unit 12 thereof and the RF unit 23 of the slave unit B. However, since it deviates from the object of the invention and it is a general operation, an illustration thereof will be omitted.

As described above, in the telephone system relating to the embodiment 2, when incoming caller telephone number data is associated with the master unit, the incoming caller telephone number data is associated with the master unit and displayed/held only at the master unit. On the other hand, when incoming caller telephone number data is associated with the slave unit, the incoming caller telephone number data is transmitted from the master unit to the associated slave unit and displayed only at the associated slave unit. In addition, the caller telephone number data which is associated with the slave unit is associated with the associated slave unit in the master unit and merely held in the master unit.

Accordingly, there is an advantage as described below when a call comes in. Since caller telephone number data of a call for the master unit A is not transmitted to any slave unit B, the caller telephone number data for the master unit is not perceived on the side of the slave unit B and privacy of the manager of the master unit is protected. Further, since caller telephone number data of a call for the slave unit B is not transmitted to either the master unit A or any other slave unit B, the caller telephone number data for that slave unit is not perceived by anyone other than the manager of that slave unit and privacy of the manager of that slave unit is protected. Moreover, even when the slave unit B is not equipped with a history storage buffer for holding caller telephone number data as incoming history data, it is possible to hold and store caller telephone number data of a call for the slave unit B as incoming history data in the master unit.

Figure 12:
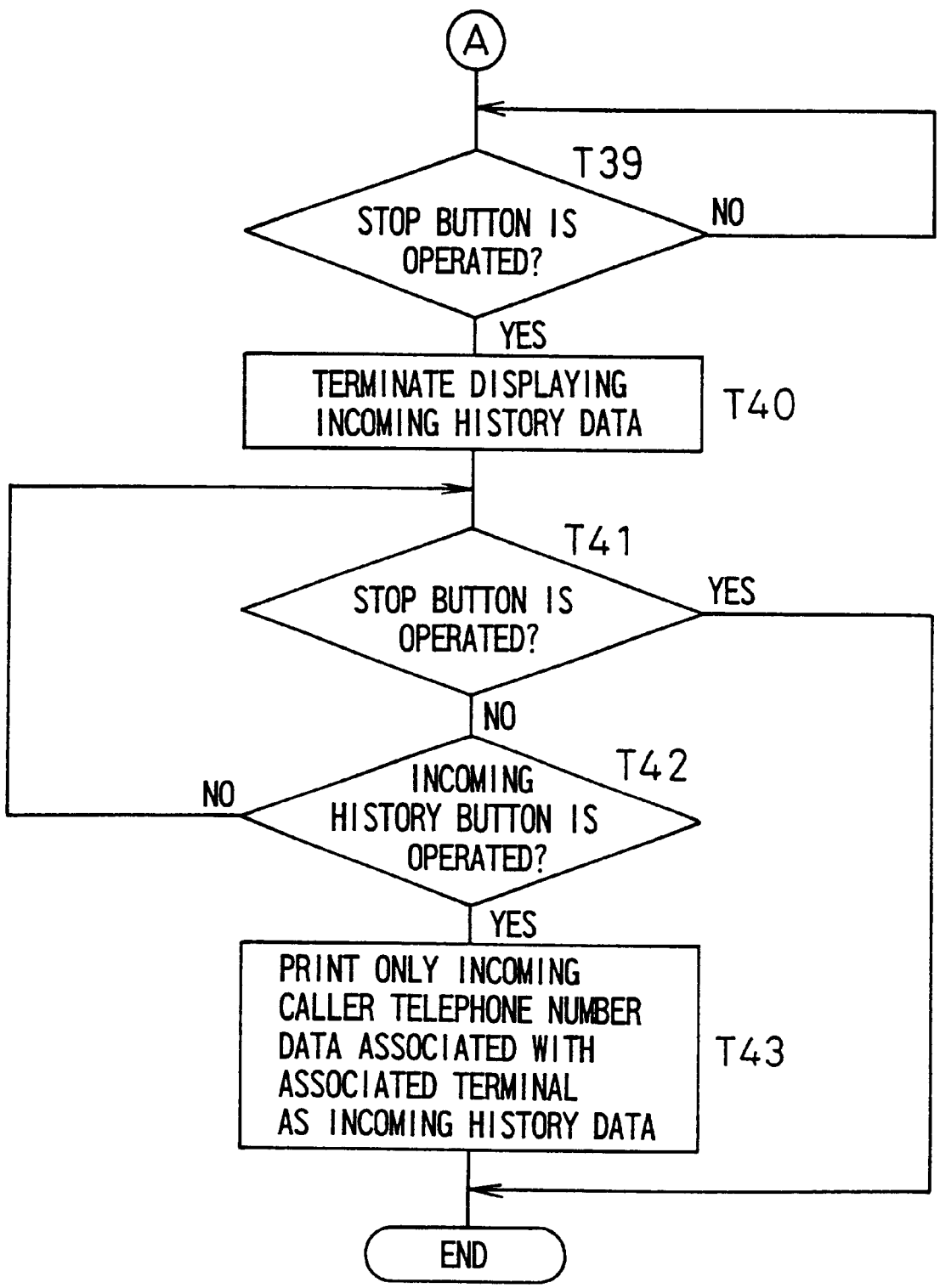

Next, an operation in a mode to display/print incoming history data in the master unit A will be illustrated with reference to a flow chart of FIG. 12. As shown in FIG. 14, by operating the group of operation buttons 8 and the group of dial buttons 7 in the master unit A in advance, secret number information in which a terminal code and a secret number are associated with each other is registered into a secret number table 9d of the storage device 9 of the master unit A. For example, a person who manages the master unit A registers a secret number by associating it with a code of the master unit, a person who manages the slave unit 1 registers a secret number by associating it with a code of the slave unit 1, and a person who manages the slave unit 2 registers a secret number by associating it with a code of the slave unit 2.

Displaying/printing incoming history data can be conducted by an instruction from the slave unit B via radio and can also be conducted by an instruction at the master unit A.

The operation in this mode is started by an operation of the incoming history button 8a of the group of operation buttons 8 in the master unit A or by an operation of the incoming history button 28c of the group of operation buttons 28 in the slave unit B. At step T31, the control unit 1 of the master unit A determines whether or not an instruction of the slave unit B which is received from the antenna 13 via the RF unit 12 is a command to display/print incoming history data, and when it is, the operation goes to step T33. On the other hand, when it is not, the operation goes to step T32 where the control unit 1 determines whether or not the incoming history button 8a of the group of operation buttons 8 in the master unit A is operated. When the incoming history button 8a is judged as being not operated, the control unit 1 terminates the process. When the incoming history button 8a is judged as being operated, the operation goes to step T33 where the control unit 1 waits until a secret number is inputted through the group of dial buttons 7, 27, and the operation goes to step T34 where the control unit 1 waits until a terminal number is inputted through the group of dial buttons 7, 27. The secret number and terminal number inputted through the group of dial buttons 7, 27 of the slave unit B are transmitted and received via radio.

When a terminal number is inputted, the secret number table 9c of the storage device 9 is searched on the basis of the inputted terminal number and an associated secret number is read out at step T35, and it is judged whether or not the inputted secret number matches the registered secret number which is read out at step T36. For instance, in the case where a manager of the master unit A inputs a secret number "○○○○" and inputs a code of the master unit #0 as a terminal number, the inputted secret number for the master unit matches the registered secret number as a result of the search on the secret number table 9d.

Even when, for example, the manager of the master unit A inputs a secret number at random and inputs a code of the slave unit 1 #1 as a terminal number for the purpose of knowing incoming history data of the slave unit 1, it is hardly occurs that the secret number which is inputted at random for the slave unit 1 matches a registered secret number as a result of the search on the secret number table 9d. Further, even when, for example, the manager of the slave unit 2 inputs a secret number at random and inputs a code of the master unit #0 for the purpose of knowing incoming history data of the master unit, it is hardly occurs that the secret number which is inputted at random for the master unit matches a registered secret number as a result of the search on the secret number table 9d. In the case where the secret numbers do not match each other, the operation goes to step T37 where an error message is displayed at the display device 10 and the process is terminated.

In the case where the secret numbers match each other, the operation goes to step T38 where the history storage buffer 9c is searched based on the inputted terminal number, and only incoming caller telephone number data that is associated with the terminal is sequentially read out and displayed as incoming history data at the display 10. After the stop button 8b, 28d of the group of operation buttons 8, 28 is operated at step T39, the operation goes to step T40 where display of the incoming history data is finished.

Then, it is determined again whether the stop button 8b, 28d is operated or not at step T41, and in the case where the stop button 8b, 28d is judged as being operated, the process is terminated. When the stop button 8b, 28d is not operated, the operation goes to step T42 where it is judged again whether the incoming history button 8a, 28c is operated or not. Although the operation goes back to step T41 when it is not operated, when it is operated, the operation goes to step T43 where the printing device 11 is controlled and only the incoming caller telephone number data for a designated terminal (only the one for the master unit in the case of the master unit, and only the one for the slave unit 1 in the case of the slave unit 1) is read out of the history storage buffer 9b to be printed as incoming history data.

As described above, in the telephone system relating to the embodiment 2, by inputting a secret number which is associated with the master unit at the master unit, incoming caller telephone number data which is associated with the master unit is displayed/printed. Further, by inputting a secret number applying to the slave unit at the master unit, incoming caller telephone number data applying to the slave unit is displayed/printed. Still further, by inputting a secret number applying to the slave unit at the slave unit, incoming caller telephone number data applying to the slave unit is displayed/printed at the master unit via a radio communication.

Accordingly, there is an advantage as described below after a plurality of calls come in. Since incoming history data of a call for the master unit A is displayed and printed when the manager of the master unit inputs a secret number which is known only by the manager of the master unit is inputted at the master unit A, only the manager of the master unit can perceive incoming history data for the master unit by one operation, and hence privacy of the manager of the master unit is protected. Further, since incoming history data of a call for the slave unit B is displayed and printed when the manager of the slave unit inputs a secret number which is known only by the manager of the slave unit at the master unit A, only the manager of the slave unit can perceive incoming history data for the slave unit by one operation, and hence privacy of the manager of that slave unit is protected. Furthermore, based on an instruction from the slave unit B to the master unit A via radio, it is also possible to display and print incoming history data of a call for that slave unit, with the result that it is possible to expand the usage.

Figure 11:
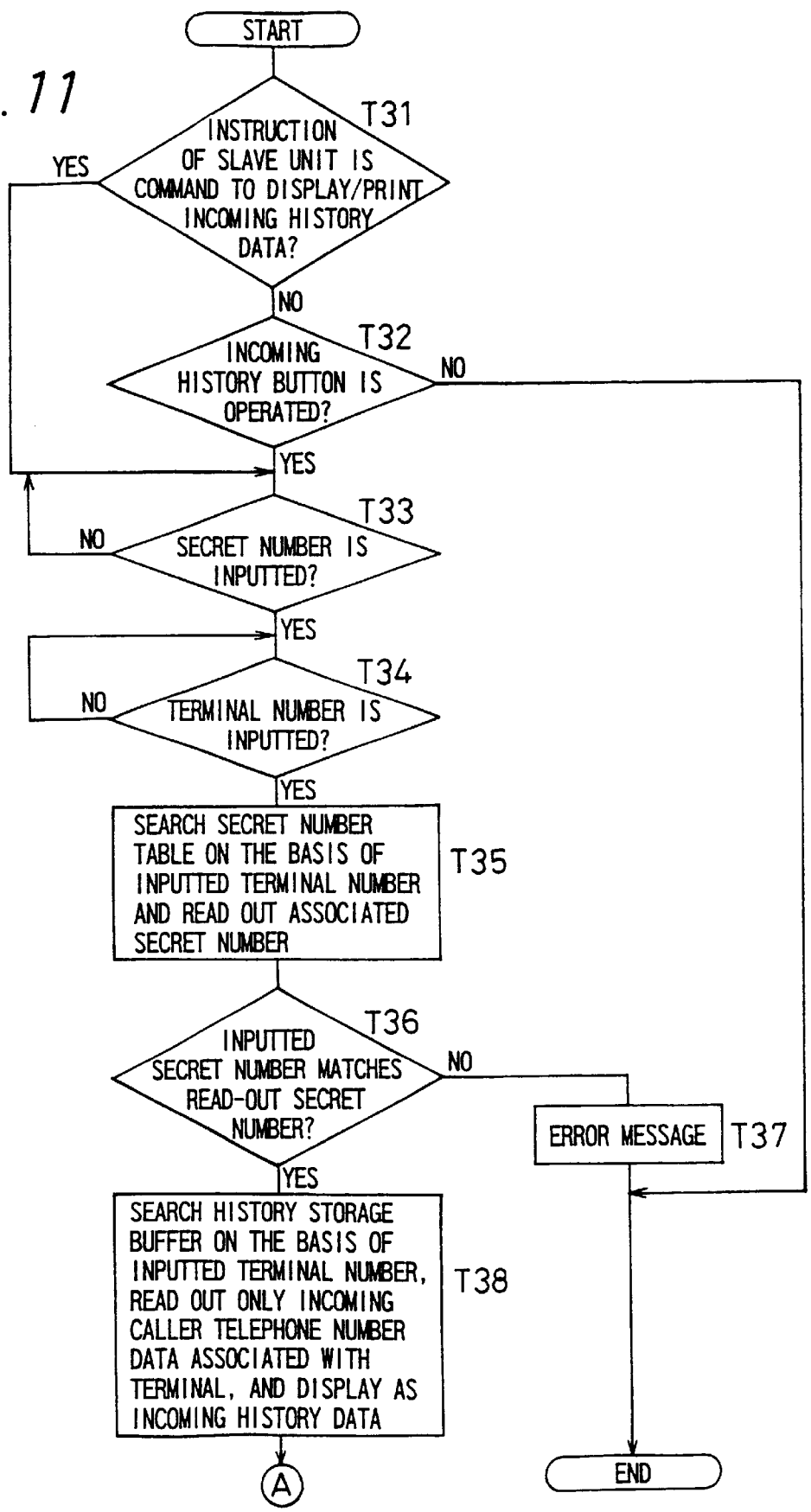
FIG. 11 and FIG. 12 are flow charts showing an operation in a mode to display/print incoming history data at the master unit in the case of the embodiment 2.
Figure 15:
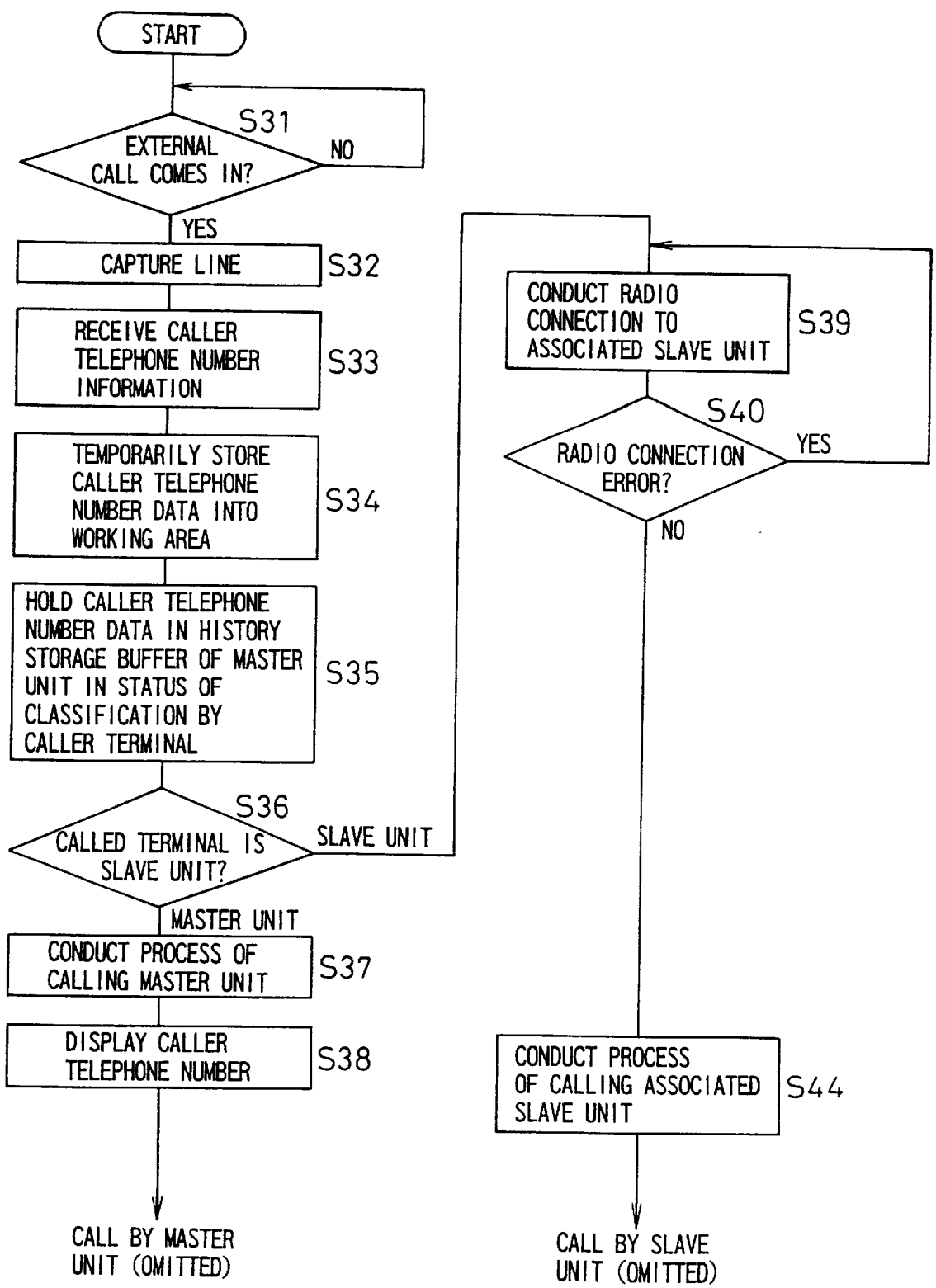
FIG. 15 is a flow chart showing an early operation of the master unit when an outside call comes in, in the case of an embodiment 3.
Figure 16:
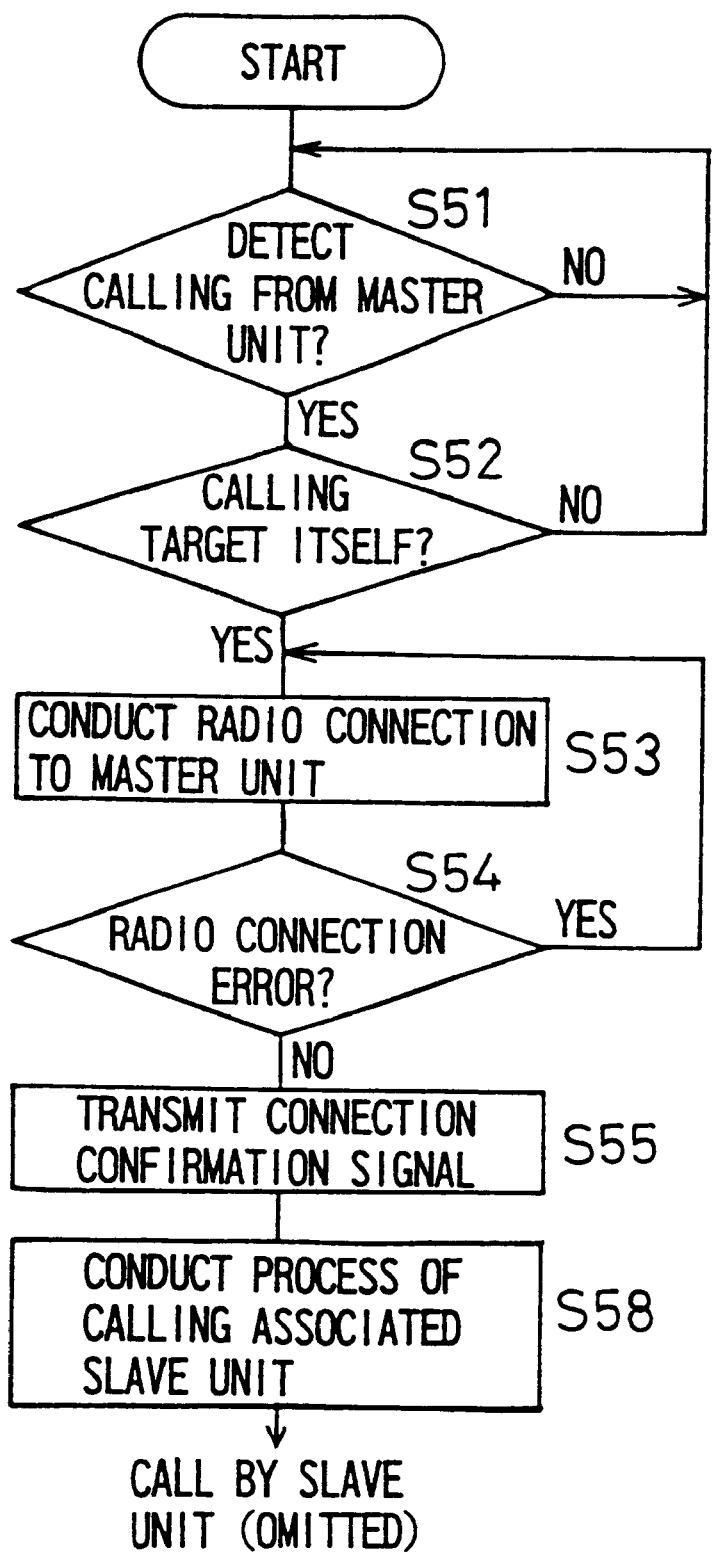
FIG. 16 is a flow chart showing an early operation of the slave unit when an outside call comes in, in the case of the embodiment 3.

Next, a telephone system relating to an embodiment 3 will be illustrated. This telephone system comprises a master unit A and at least one slave unit B, wherein the slave unit B is not equipped with means for storing incoming history data of a caller telephone number and moreover is not provided with a function of displaying a caller telephone number. An operation of the master unit A in the above case when an outside call comes in will be illustrated in a flow chart of FIG. 15. The flow chart of FIG. 15 is an equivalent to the one that steps S41, S42 and S43 are omitted in the flow chart of FIG. 9. Further, an operation of the slave unit B when an outside call comes in will be shown in a flow chart of FIG. 16. The flow chart of FIG. 16 is an equivalent to the one that steps S56, S57 and S59 are omitted in the flow chart of FIG. 10. In the case of the telephone system of this embodiment 3, a caller telephone number is not displayed and caller telephone number data is not held as incoming history data. An operation of displaying/printing incoming history data is the same as shown in FIG. 11 and FIG. 12.

As described above, in the telephone system relating to the embodiment 3, when incoming caller telephone number data is associated with the master unit, the incoming caller telephone number data is associated with the master unit and displayed/held only at the master unit, and when incoming caller telephone number data is associated with the slave unit, the incoming caller telephone number data which is associated with the slave unit is associated with the associated slave unit in the master unit and merely held at the master unit. Transmission of caller telephone number data from the master unit to the slave unit is not conducted. Also in this case, the same action as the embodiment 2 is brought.

Next, a telephone system relating to an embodiment 4 will be illustrated. This telephone system comprises a master unit A and at least one slave unit B, wherein as well as the embodiment 1, the slave unit B is also equipped with means for storing incoming history data of a caller telephone number, and furthermore in the case where transmission of caller telephone number data to the slave unit B ends in fail, the caller telephone number data is stored in the master unit A. The configuration of the master unit A and the configuration of the slave unit B in the case of the embodiment 4 are identical to those in the case of the embodiment 1, respectively.

Figure 17:
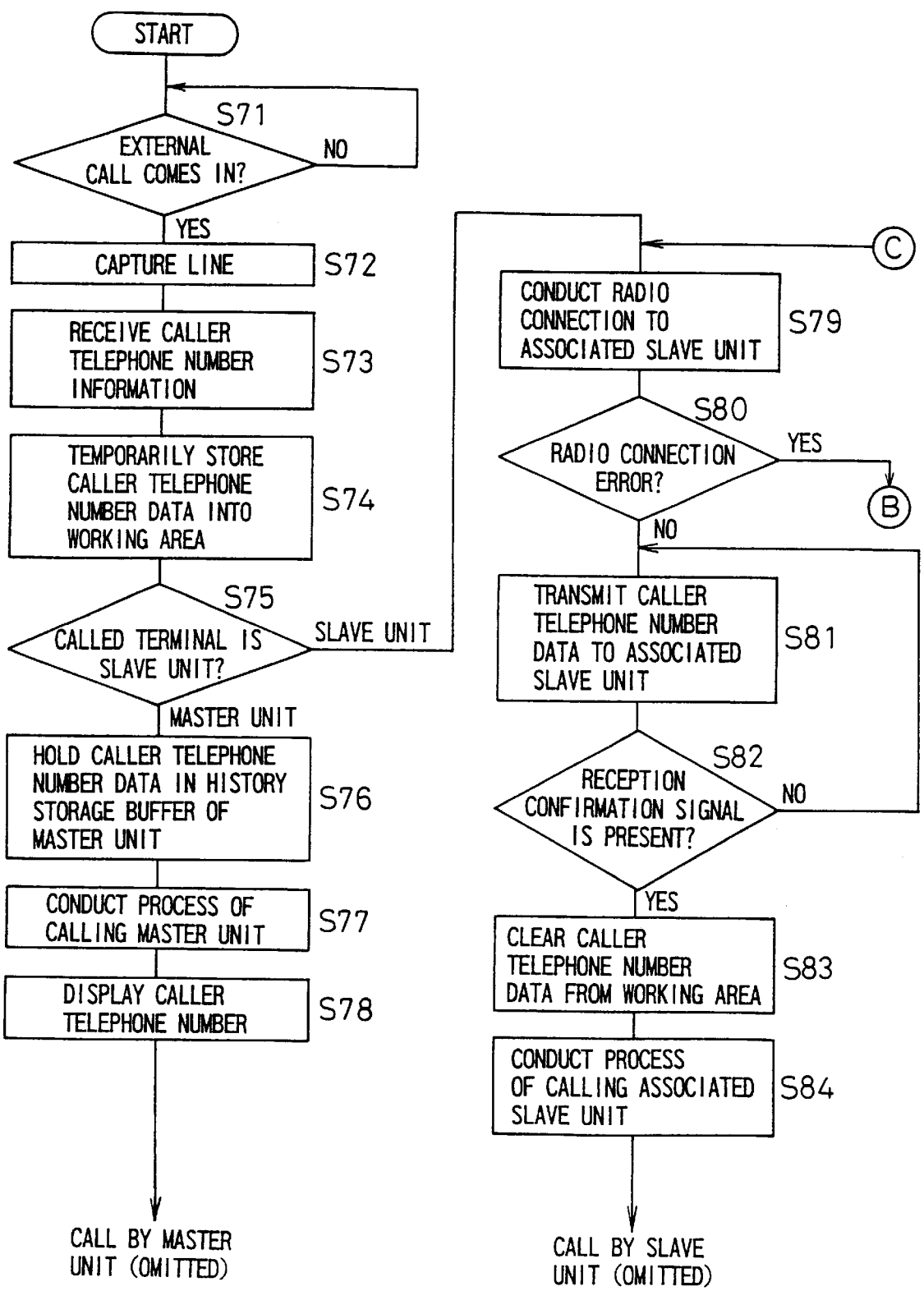
FIG. 17 and FIG. 18 are flow charts showing an early operation of the master unit when an outside call comes in, in the case of an embodiment 4.
Figure 18:
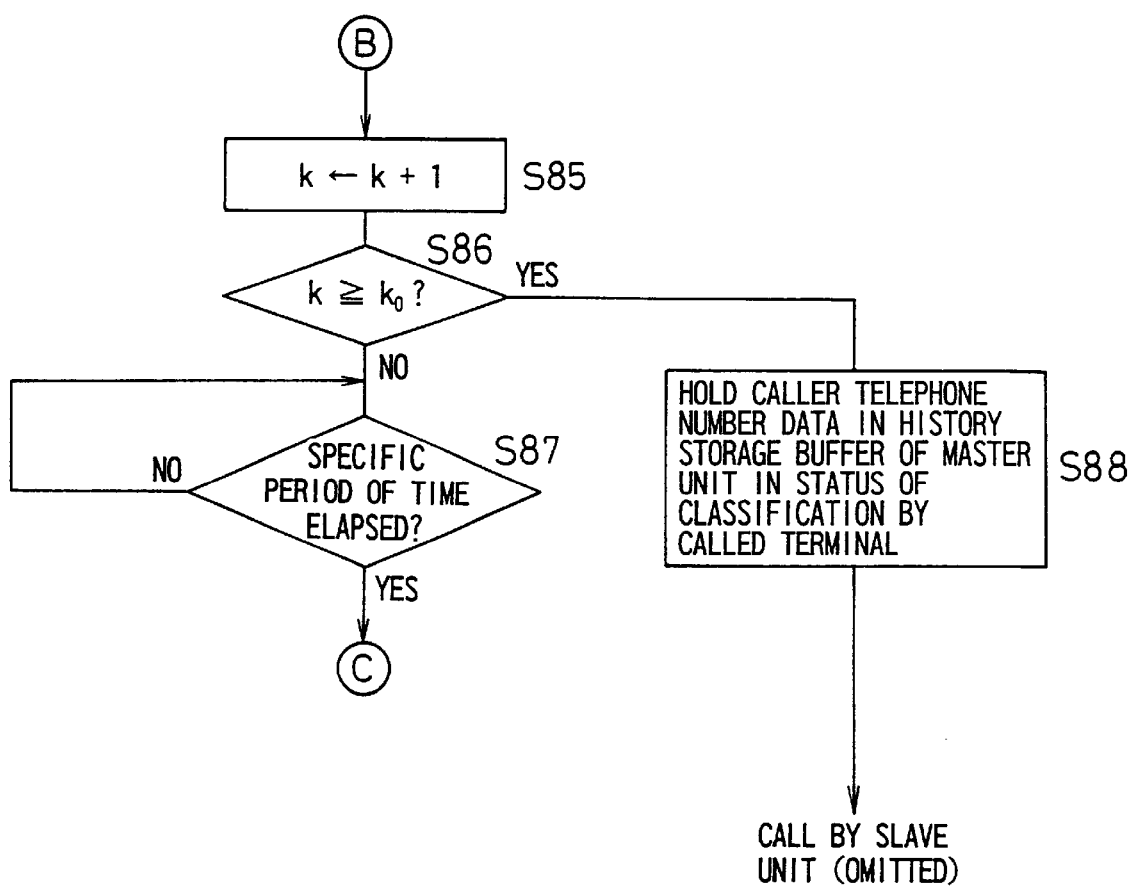

An early operation of the master unit A of the telephone system configured as described above when an outside call comes in will be illustrated with reference to flow charts of FIG. 17 and FIG. 18. The control unit 1 of the master unit A determines whether an outside call comes in or not via the network control unit 2 at step S71, and when an outside call comes in, the operation goes to step S72 where the control unit 1 directs the network control unit 2 to trap a line. At step S73, the control unit 1 directs the data decode circuit 5 to capture caller telephone number information. The data decode circuit 5 decodes caller telephone number information which is sent from the line and obtains caller telephone number data. At step S74, the control unit 1 temporarily stores the obtained caller telephone number data into a working area of the storage device 9.

At step S75, the control unit 1 searches the telephone directory table 9a of the storage device 9 on the basis of the obtained caller telephone number data and determines whether a terminal to be called (a called terminal) is the slave unit or not. In the case where the terminal to be called is judged as being the master unit, the operation goes to step S76 where the control unit 1 holds the caller telephone number data which is temporarily stored in the working area of the storage device 9, in a history storage buffer 9b of the storage device 9 as shown in FIG. 6A, and the control unit 1 directs the speaker 6 of the master unit A to output a call tone in synchronization with an outside call incoming signal which is received via the network control unit 2 at step S77 and reads the caller telephone number data out of the working area of the storage device 9 to output it to the display device 10 and display the caller telephone number at the display device 10 at step 78.

After these operations, when the handset 3 is lifted at the master unit A, the handset lift/putdown detection device 4 detects it, and the operation goes to a process of conducting a call. However, since it deviates from the object of the invention and it is a general operation, an illustration thereof will be omitted. When the call is finished and the handset 3 is put down to be on-hook, the caller telephone number data is cleared from the working area of the storage device 9.

In the case where the called terminal is the slave unit as a result of the judgement at step S75, the operation goes to step S79 where the control unit 1 provides an instruction to conduct a radio connection to the associated slave unit B from the RF unit 12 via the antenna 13. Then, the control unit 1 determines whether a radio connection error occurs or not on the basis of radio connection information from the slave unit B at step S80, and in the case where an error occurs, the operation goes to step S85.

In the case where a radio connection is normally conducted, the operation goes to step S81 where the control unit 1 reads the caller telephone number data out of the working area of the storage device 9 and transmits the caller telephone number data from the RF unit 12 to the associated slave unit B via the antenna 13, the control unit 1 determines whether or not it receives from the slave unit B a reception confirmation signal for confirming that the slave unit B receives the caller telephone number data at step S82. When the reception confirmation signal is not present, the operation goes back to step S81 where transmission of the caller telephone number data to the slave unit B is repeated. In the case where a reception confirmation signal is present, the operation goes to step S83 where the caller telephone number data is cleared from the working area of the storage device 9. At step S84, a calling process to the associated slave unit B is conducted.

In the case where an error occurs in a radio connection go to the slave unit B as a result of the judgement at step S80, the operation goes to step S85 where a variable k of the number of radio connection access is incremented, it is judged whether or not the variable k reaches a preset repetition number $k_0$ at step S86. When it does not reach, the operation goes to step S87 where the lapse of a specific period of time is waited, and goes back to step S79 where the instruction of a radio connection to the slave unit B is repeated. When the variable k of the number of radio connection access reaches the repetition number $k_0$ and the judgement at step S86 turns to be positive, the operation goes to step S88 where caller telephone number data which is temporarily stored in the working area of the storage device 9 is held in the history storage buffer 9c in the storage device 9 as shown in FIG. 13 in the status of being classified for each called terminal which is associated in the telephone directory table 9a in advance.

Then, after these operations, when the call button 28a of the group of operation buttons 28 is pushed at the slave unit B, the operation goes to a call between the slave unit B and the counterpart telephone terminal, and until the call at the slave unit B is finished, the RF unit 12 of the master unit A and the RF unit 23 of the slave unit B keep a status of a radio connection. However, since it deviates from the object of the invention and it is a general operation, an illustration thereof will be omitted.

The operation of the slave unit B is identical to the one that is described with reference to FIG. 4 in the embodiment 1. In addition, the operation of displaying/printing incoming history data is identical to the one that is described with reference to FIGS. 7 and 8 in the embodiment 1 and the one that is described with reference to FIGS. 11 and 12 in the embodiment 2.

As described above, in the telephone system relating to the embodiment 4, when incoming caller telephone number data is associated with the master unit, the incoming caller telephone number data is displayed/held only at the master unit. On the other hand, when incoming caller telephone number data is associated with the slave unit, the incoming caller telephone number data is transmitted from the master unit to the associated slave unit and displayed/held only at the associated slave unit. Furthermore, in the case where transmission of caller telephone number data from the master unit to the associated slave unit ends in failure, the caller telephone number data which is associated with the slave unit is associated with the associated slave unit and merely held at the master unit.

Accordingly, there is an advantage as described below when a call comes in. Since caller telephone number data of a call for the master unit A is not transmitted to any slave unit B, the caller telephone number data for the master unit is not perceived on the side of the slave unit B and privacy of the manager of the master unit is protected. On the other hand, since caller telephone number data of a call for the slave unit B is not transmitted to either the master unit A or any other slave unit B, the caller telephone number data for the slave unit is not perceived by anyone other than the manager of that slave unit and privacy of the manager of that slave unit is protected. Furthermore, in the case where a radio connection to the slave unit B ends in failure, caller telephone number data which is associated with the slave unit is associated with the associated slave unit and held in the history storage buffer 9c in the master unit A, with the result that it is possible to preserve caller telephone number data which is associated with the slave unit as a history, and since it is not displayed at the master unit A, it is possible to protect privacy on it. In addition, after a plurality of calls come in, when the manager of the slave unit inputs a secret number which is known only by the manager of the slave unit at the master unit A or through an instruction from the slave unit B via radio, incoming history data of a call for the slave unit B which cannot be held in the slave unit B as incoming history data is displayed and printed, so that only the manager of the slave unit is capable of confirming the incoming history data for the slave unit by one operation, and privacy of the manager of the slave unit is protected.

Furthermore, the telephone system relating to the embodiment 4 attempts a radio connection again after failure of a radio connection, and when the radio connection is succeeded, the telephone system transmits caller telephone number data from the master unit to the associated slave unit, and deletes caller telephone number data which is associated with the associated slave unit and held in the master unit. When the master unit and the slave unit come to be connected via radio, caller telephone number data which is stored in the master unit is deleted as soon as transmitted, so that privacy of the manager of the slave unit is reliably protected.

Up to this point illustrated are four embodiments, in any of which, in the case where the telephone system is equipped with a facsimile apparatus, it is possible to cause the facsimile apparatus to print incoming history data. It may be configured so that incoming history data is displayed but not printed, or may be configured so that incoming history data is printed but not displayed. Further, it may be configured so that when a call comes in or when a history is confirmed, not only caller telephone number data or incoming history data but also data of incoming time, the user name of a counterpart telephone, the address of the user and so on are displayed/printed when they cannot be displayed at a time, they are displayed by switching.

In the case where the display area of the display device 10, 30 is small to display incoming history data, the "#" button 4 of the group of dial buttons 7, 27, for example, may be used as a forward button, whereby incoming history data is switched and displayed little by little (e.g., by one line, by two lines) from a new one to an old one. In this case, the "*" button, for example, may be used as a backward button, whereby data is switched and displayed from an old one to a new one.

Although not described in the above embodiments in specific, it is supposed to be well known that display of a caller telephone number is not conducted in a status that the number display service is not contracted, and such displays as "an outside call comes in," "a public telephone call comes in" and "a mobile telephone call comes in" are conducted.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A telephone system comprising:

a master unit and at least one slave unit;

wherein when incoming caller telephone number data is associated with the master unit, the incoming caller telephone number data is displayed or held only at the master unit, and when incoming caller telephone number data is associated with the slave unit, the incoming caller telephone number data is transmitted from the master unit to the associated slave unit and displayed or held only at the associated slave unit; and wherein when the transmission of incoming caller telephone number data from the master unit to the associated slave unit ends in failure, the incoming caller telephone number data is held at the master unit in association with the associated slave unit.

2. The telephone system of claim 1, wherein a transmission of the incoming caller telephone number data from the master unit to the associated slave unit is attempted again after the failure of the transmission, and when said transmission is successfully conducted, the incoming caller telephone number data which is held at the master unit in association with the associated slave unit is deleted.

3. A telephone system comprising:

a master unit and at least one slave unit;

wherein when incoming caller telephone number data is associated with the master unit, the incoming caller telephone number data is displayed or held only at the master unit, and when incoming caller telephone number data is associated with the slave unit, the incoming caller telephone number data is transmitted from the master unit to the associated slave unit and displayed or held only at the associated slave unit; and wherein incoming caller telephone number data which is associated with the master unit is displayed or printed by inputting a secret number at the master unit, while incoming caller telephone number data which is associated with the slave unit is displayed by inputting a secret number at the slave unit.

4. A telephone system comprising a master unit and at least one slave unit, wherein when incoming caller telephone number data is associated with the master unit, the incoming caller telephone number data is displayed or held only at the master unit, and when incoming caller telephone number data is associated with the slave unit the incoming caller telephone number data is held in the master unit in association with the associated slave unit;

wherein incoming caller telephone number data which is associated with the master unit is displayed or printed by inputting a secret number which is associated with the master unit, at the master unit, incoming caller telephone number data which is associated with the slave unit is displayed or printed by inputting a secret number which is associated with the slave unit, at the master unit, and incoming caller telephone number data which is associated with the slave unit is displayed or printed at the master unit via a radio communication by inputting a secret number which is associated with the slave unit, at the slave unit.

5. A telephone system comprising:

a master unit and at least one slave unit;

wherein when incoming caller telephone number data is associated with the master unit, the incoming caller telephone number data is displayed or held only at the master unit in association with the master unit;

when incoming caller telephone number data is associated with the slave unit, the incoming caller telephone number data is transmitted from the master unit to the associated slave unit to display only at the associated slave unit, and is held in the master unit in association with the associated slave unit;

wherein incoming caller telephone number data which is associated with the master unit is displayed or printed by inputting a secret number which is associated with the master unit, at the master unit, wherein incoming caller telephone number data which is associated with the slave unit is displayed or printed by inputting a secret number which is associated with the slave unit, at the master unit, and incoming caller telephone number data which is associated with the slave unit is displayed or printed at the master unit via a radio communication by inputting a secret number which is associated with the slave unit, at the slave unit.

* * * * *